United States Patent [19]
Yu et al.

[11] Patent Number: 5,872,717
[45] Date of Patent: Feb. 16, 1999

[54] APPARATUS AND METHOD FOR VERIFYING THE TIMING PERFORMANCE OF CRITICAL PATHS WITHIN A CIRCUIT USING A STATIC TIMING ANALYZER AND A DYNAMIC TIMING ANALYZER

[75] Inventors: Robert Yu, Santa Clara; Paul Yip, Milpitas; Manjunath Doreswamy, Sunnyvale, all of Calif.

[73] Assignee: Sun Microsystems, Inc., Mountain View, Calif.

[21] Appl. No.: 705,398

[22] Filed: Aug. 29, 1996

[51] Int. Cl.$^6$ ............................. G06F 17/00; G06F 17/50
[52] U.S. Cl. ........................ 364/489; 364/488; 364/490; 364/491
[58] Field of Search ................................... 364/488–491, 364/578

[56] References Cited

U.S. PATENT DOCUMENTS

| | | | |
|---|---|---|---|
| 5,095,454 | 3/1992 | Huang | 364/578 |
| 5,396,435 | 3/1995 | Ginetti | 364/489 |
| 5,544,071 | 8/1996 | Keren et al. | 364/489 |
| 5,608,645 | 3/1997 | Spyrou | 364/491 |
| 5,638,290 | 6/1997 | Ginetti et al. | 364/489 |
| 5,654,898 | 8/1997 | Roetchisoender et al. | 364/490 |

*Primary Examiner*—Kevin J. Teska
*Assistant Examiner*—Vuthe Siek
*Attorney, Agent, or Firm*—Flehr Hohbach Test Albritton & Herbert LLP; William S. Galliani

[57] ABSTRACT

A method of improving the timing performance of a circuit includes the step of producing a first set of timing results from a static timing analyzer operating on a netlist that characterizes a circuit. A critical timing path within the circuit is then identified from the first set of timing results. The critical timing path is then converted into an equivalent schematic circuit representation. A simulation of the equivalent schematic circuit representation on a circuit simulator produces a second set of timing results. Timing discrepancies are then located between the first set of timing results and the second set of timing results. Based upon the timing discrepancies, cells are substituted into the critical timing path to improve the timing performance of the critical timing path.

3 Claims, 6 Drawing Sheets

APPARATUS AND METHOD FOR VERIFYING THE TIMING PERFORMANCE OF CRITICAL PATHS WITHIN A CIRCUIT USING A STATIC TIMING ANALYZER AND A DYNAMIC TIMING ANALYZER

BRIEF DESCRIPTION OF THE INVENTION

This invention relates generally to the design of integrated circuits. More particularly, this invention relates to a technique for verifying and improving the timing performance of critical paths within an integrated circuit by relying upon redundant timing analyses of the critical paths.

BACKGROUND OF THE INVENTION

Very Large Scale Integrated (VLSI) circuits are designed using a variety of Computer Aided Design (CAD) tools. The development of VLSI circuits with CAD tools is often referred to as Electronic Design Automation (EDA). A VLSI circuit can be characterized by a netlist. A netlist is a list of circuit components and interconnections between the circuit components. An EDA tool known as a static timing analyzer is used to verify that the circuit described in the netlist meets timing requirements.

A static timing analyzer accesses circuit timing performance by relying upon timing attributes, as specified in a library of timing models, for individual circuit components in the netlist. The library of timing models includes timing information for each circuit component in the netlist. The timing information includes such information as the input pin capacitance, input-to-output delay, and output drive strengths. Combining this library along with a design netlist, a static timing analyzer generates critical path timing information statically without knowledge of the design's logical functionality.

The timing estimates associated with a static timing analyzer are not as accurate as those provided by a circuit simulator. Circuit simulators such as SPICE or HSPICE can be considered dynamic timing analyzers, although they are used for more than timing analyses. Since a circuit simulator simulates the actual operation of a circuit at the transistor level, it is relatively time consuming to obtain results from a circuit simulator, compared to a static timing analyzer that does not simulate the operation of the component, but uses static timing information for the component.

It would be highly desirable to provide a design tool that verifies the timing information supplied by a static timing analyzer. Preferably, such a tool would utilize a circuit simulator, but not be hampered by the computational expense typically associated with the operation of a circuit simulator. The improved timing information could then be used to refine the circuit design process.

SUMMARY OF THE INVENTION

The method of the invention includes the step of producing a first set of timing results from a static timing analyzer operating on a netlist that characterizes a circuit. A critical timing path within the circuit is then identified from the first set of timing results. The critical timing path is then converted into an equivalent schematic circuit representation. A simulation of the equivalent schematic circuit representation on a circuit simulator produces a second set of timing results. Timing discrepancies are then located between the first set of timing results and the second set of timing results. Based upon the timing discrepancies, cells may be substituted into the critical timing path to improve the timing performance of the critical timing path.

By concentrating on the critical timing paths within a circuit, overall circuit timing performance can be greatly improved with relatively few design changes. The use of a circuit simulator improves upon the timing information that is provided by the static timing analyzer. The invention efficiently utilizes the circuit simulator through a conversion of the critical timing path into an equivalent schematic circuit representation. The novel conversion process includes the use of ideal circuit elements to reduce the time required for circuit simulation. In addition, the conversion process features correct input sensitization, in accordance with a predetermined rule set, for unconnected input nodes in the equivalent schematic circuit representation in order for the circuit simulator to simulate the same signal transitions as those estimated by the static timing analyzer. The sensitization is preferably applied to all combinatorial gates, multiplexers, and register elements.

BRIEF DESCRIPTION OF THE INVENTION

For a better understanding of the nature and objects of the invention, reference should be made to the following detailed description taken in conjunction with the accompanying drawings, in which.

Figure 3A:
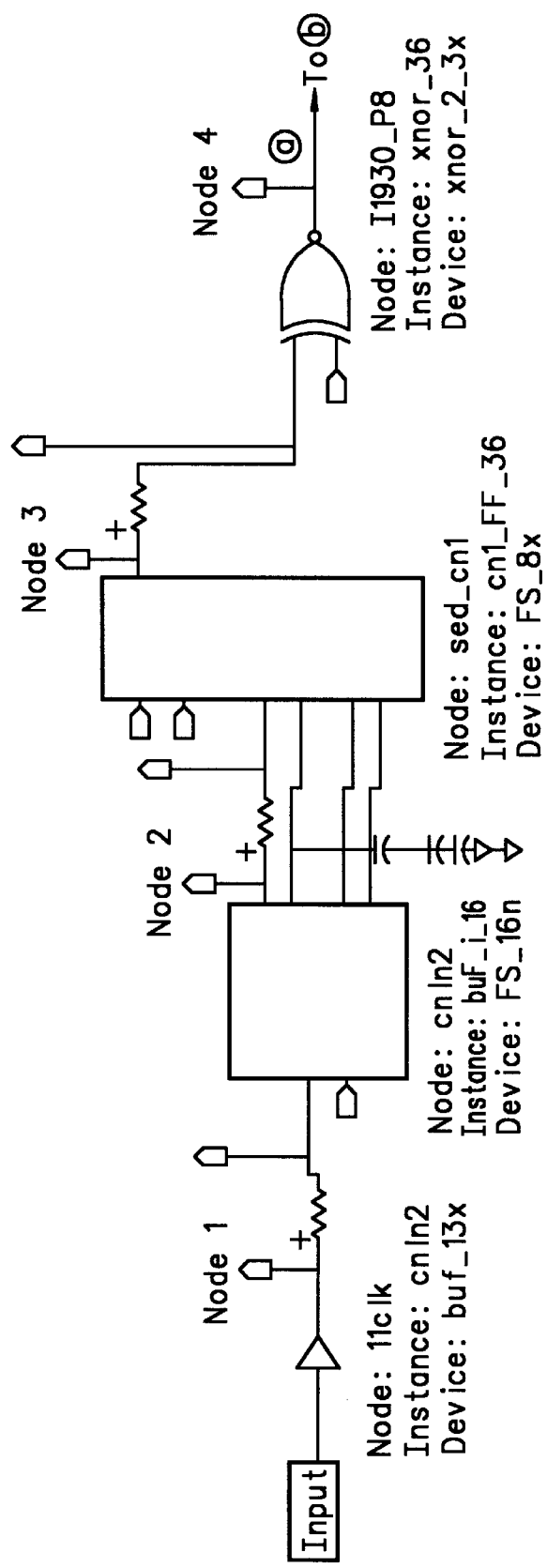
Figure 3B:
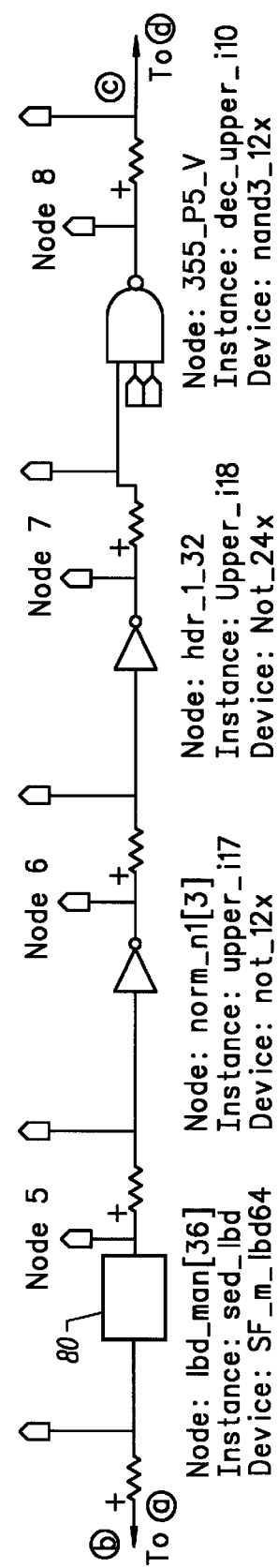
Figure 3C:
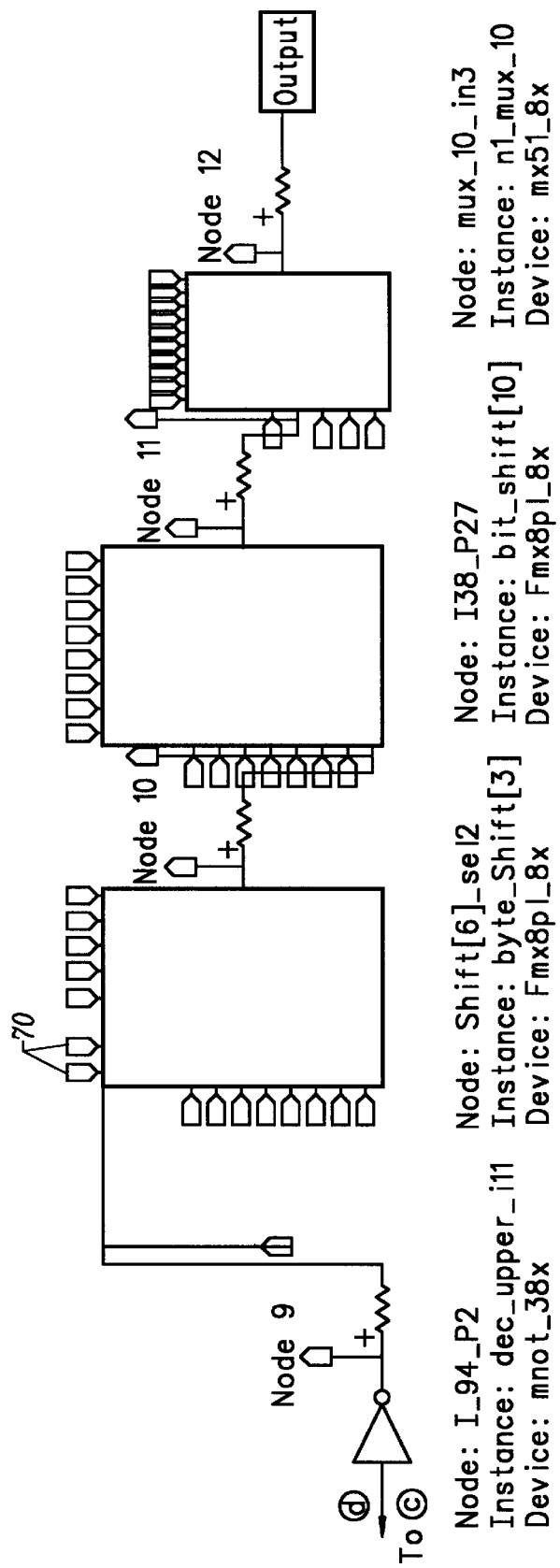

FIGS. 3(a)–3(c) illustrate an equivalent circuit schematic of a critical timing path, as constructed in accordance with an embodiment of the invention.

Figure 4:
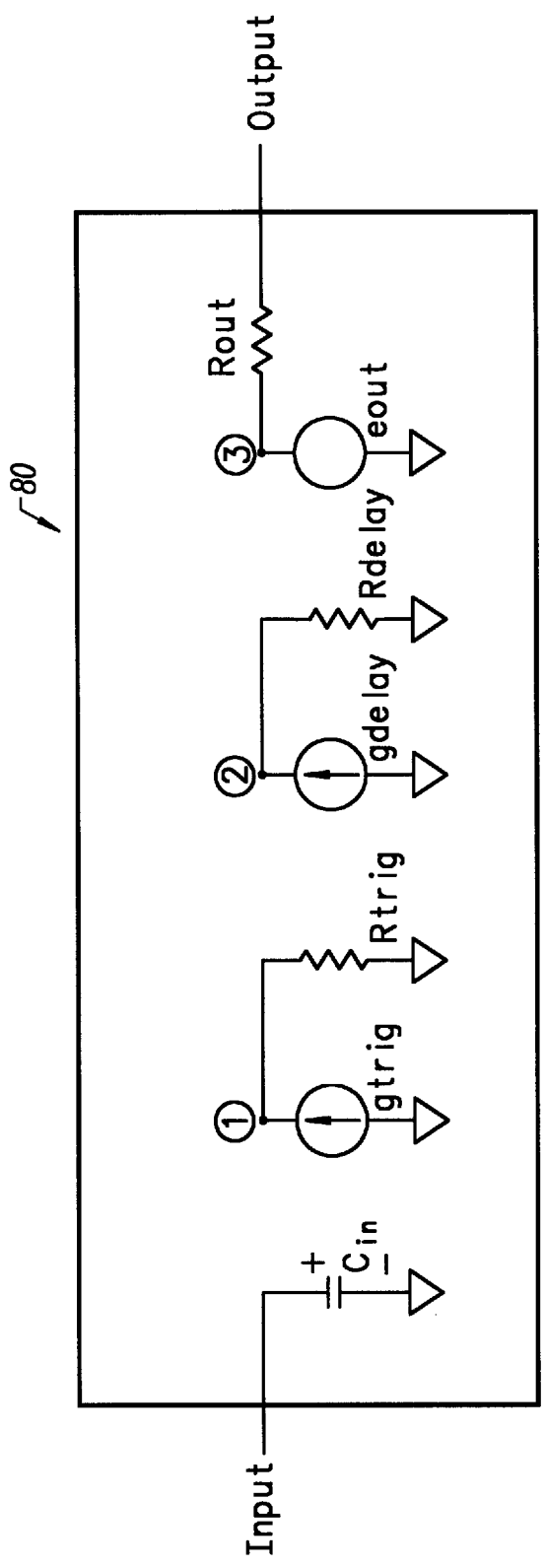

FIG. 4 illustrates an ideal circuit element constructed in accordance with an embodiment of the invention.

Like reference numerals refer to corresponding parts throughout the drawings.

DETAILED DESCRIPTION OF THE INVENTION

Figure 1:
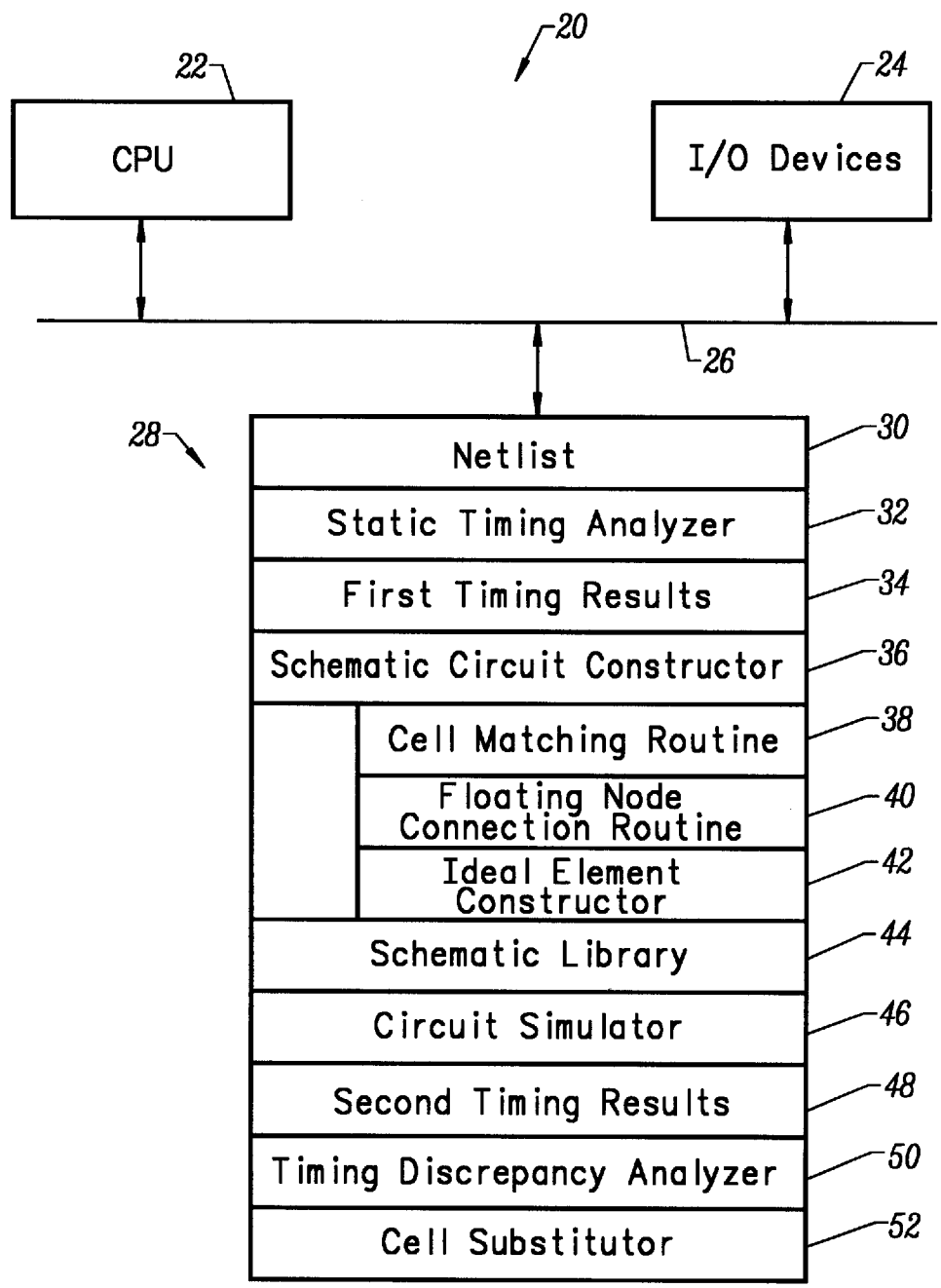
FIG. 1 illustrates an apparatus constructed in accordance with an embodiment of the invention.

FIG. 1 illustrates an apparatus 20 constructed in accordance with an embodiment of the invention. The apparatus 20 includes a Central Processing Unit (CPU) 22 that communicates with a set of input/output devices 24 over a system bus 26. Further, the CPU 22 communicates with a memory 28 via system bus 26. The interaction between a CPU 22, input/output devices 24, a system bus 26, and memory 28 are known in the art.

The present invention is directed toward the data and programs that are stored in the memory 28 and are processed by the CPU 22. The memory 28 stores a netlist 30, which is processed by a static timing analyzer 32. For example, the static timing analyzer 32 may be implemented as the PEARL™ Timing Analyzer sold by CADENCE DESIGN AUTOMATION, Inc., San Jose, Calif. As known in the art, the static timing analyzer 32 generates a set of timing results, illustrated in FIG. 1 as a first set of timing results 34. In accordance with the prior art, this initial set of timing results is relied upon to verify that the circuit characterized by the netlist 30 meets selected timing constraints. The static timing analyzer 32 will identify different data paths through the circuit specified by the netlist. The data paths with the largest delays are identified by the static timing analyzer 32 as critical timing paths. One way to improve the timing performance of a critical timing path is to substitute relatively slow circuit components in the critical timing path with logically equivalent circuit components that are relatively fast.

The present invention improves upon this process by obtaining more accurate timing information about a critical timing path. In other words, instead of relying solely upon the timing information provided by the static timing analyzer 32, the present invention uses a circuit simulator to simulate the operation of the critical timing path. In order to achieve this benefit, a number of operations must be performed.

FIG. 1 illustrates that the memory includes a schematic circuit constructor 36. As its name implies, the schematic circuit constructor is used to construct a schematic circuit for a critical timing path. The schematic circuit can then be simulated by a circuit simulator 46.

The schematic circuit constructor 36 includes a cell matching routine 38. The cell matching routine 38 identifies the different cells in the critical timing path and matches each one with a corresponding schematic circuit from the schematic library 44. The floating node connection routine 40 establishes node connections for circuit elements in the critical timing path that include nodes that are not part of the critical timing path. In other words, the floating node connection routine 40 ties floating inputs to predetermined values so that the corresponding circuit element can be simulated accurately.

Finally, the schematic circuit constructor 36 includes an ideal element constructor 42. The ideal element constructor 42 is used to establish an ideal element or circuit schematic for circuit elements that are so large that their simulation would result in an unjustified performance penalty. In other words, in accordance with the invention, the schematic library 44 includes a set of schematic circuits for circuit elements of predetermined sizes. If a circuit element, for instance a large Arithmetic Logic Unit, exceeds that predetermined size, then the circuit element is not included in the schematic library 44. If the schematic circuit constructor 36 does not identify a match in the schematic library 44, then it constructs a corresponding ideal circuit element, as will be described below.

After a schematic circuit is constructed for a critical timing path, the schematic circuit is simulated with a circuit simulator 46. The circuit simulator 46 generates a second set of timing results 48. Comparisons between the first set of timing results 34 and the second set of timing results 48 are then analyzed with a timing discrepancy analyzer 50. The discrepancies identified by this executable code are then used to provide a more accurate characterization of the timing performance of the critical timing path and the individual elements within the critical timing path. Based upon this refined information, a cell substituter 52 may be used to substitute poorly performing circuit elements in the critical timing path for logically equivalent, but faster circuit elements.

Figure 2:
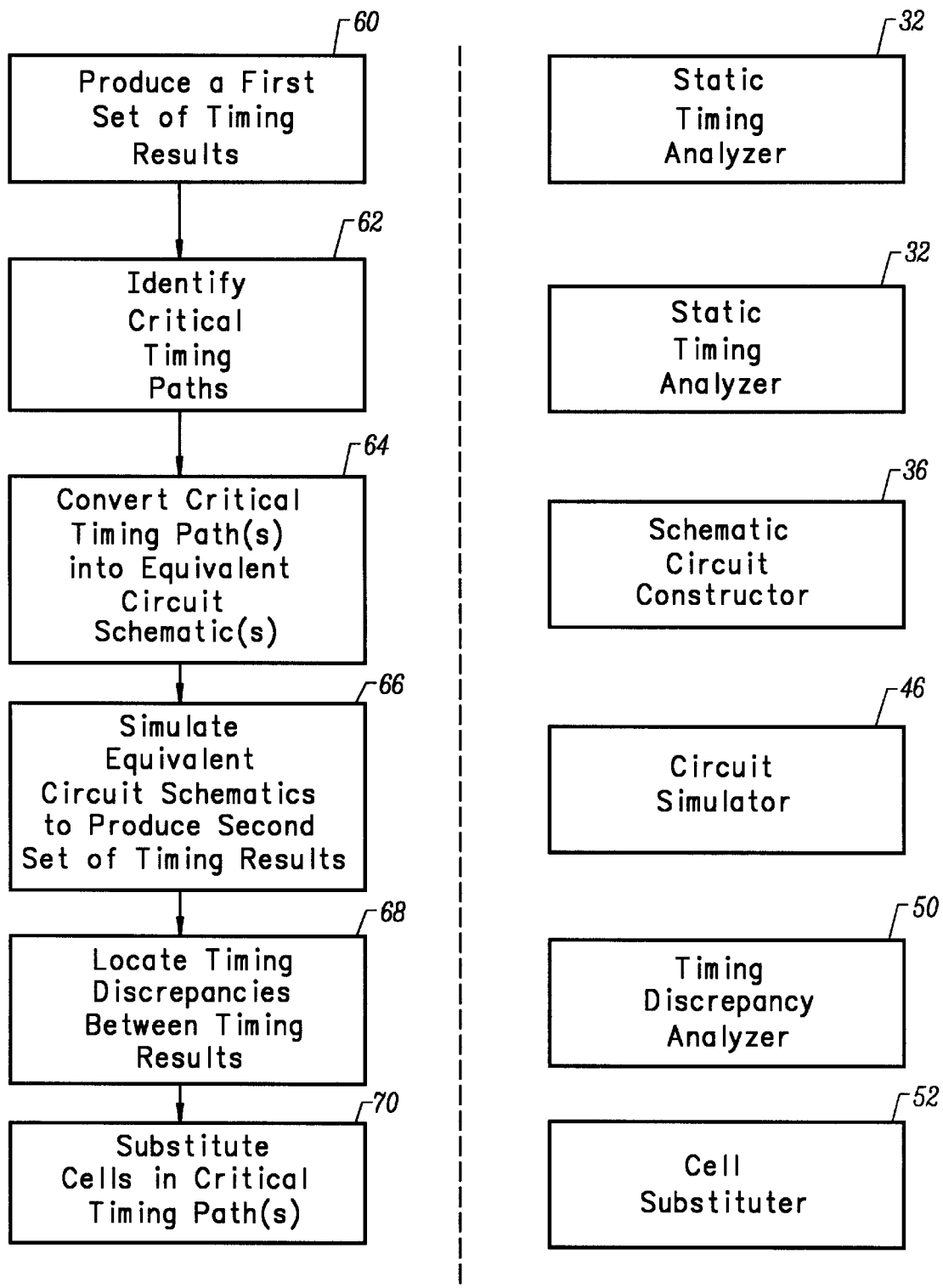
FIG. 2 illustrates processing steps, and corresponding apparatus for performing the processing steps, in accordance with an embodiment of the invention.

The nature of the invention is more fully appreciated with reference to FIGS. 2–4. FIG. 2 illustrates the processing steps associated with an embodiment of the invention, while FIGS. 3–4 illustrate circuit elements used to demonstrate an embodiment of the invention.

Turning now to FIG. 2, the first processing step shown in the figure is to produce a first set of timing results (step 60). As shown on the right-hand side of the figure, this operation is performed by a static timing analyzer 32 of the type known in the art. The next processing step is to identify critical timing paths within the netlist (step 62). This operation is also performed with a standard static timing analyzer 32. The static timing analyzer 32 may report the critical timing paths in the form of a report. By way of example, the following table is a report from a static timing analyzer for one critical timing path in a netlist.

TABLE I

STATIC TIMING ANALYZER CRITICAL PATH OUTPUT REPORT

| Delay | Node | Instance | Device |
|---|---|---|---|
| 0.12 ns | llc1k | cnln2 | buf__13x |
| 0.12 ns | cnln2 | buf_i__16__3 | fs__16n |
| 0.12 ns | sed__cn1 | cn1__ff__36 | fs__8x |
| 0.38 ns | I1930__P8 | xnor__36 | xnor2__3x |
| 0.71 ns | lbd__man[36] | sed__lbd | sf__m__lbd64 |
| 2.18 ns | norm__n1[3] | upper__i17 | not__12x |
| 2.30 ns | hdr__I__32 | upper__i18 | not__24x |
| 2.45 ns | 355__P5 | upper__i10 | nand3__12x |
| 2.73 ns | I__94__P2 | upper__i11 | mnot__38x |
| 2.97 ns | shift[6]__sel2 | byte__shift[3] | fmx8pl__8x |
| 3.35 ns | I38__p27 | bit__shift[10] | fmx8pl__8x |
| 3.62 ns | mux__10__in3 | n1__mux__10 | mx51__8x |

Each row in Table I provides the following information. First, a delay value in nano-seconds is provided. Then, a node name to an instance of a circuit element is provided. Finally, the device name for the instance is provided. By way of example, the first row of Table I lists a delay of 0.12 nano-seconds for the device or circuit element "buf__13x". This circuit element is a buffer available in a cell library. This circuit element may be used many times in a netlist, each "instance" of its use is assigned a different name, in this example the name is "cnln2". The input to the device is node "llclk", as shown in row 1.

The next processing step of FIG. 2 is to convert the critical timing path into an equivalent circuit schematic (step 64). This operation is performed by the schematic circuit constructor 36. The schematic circuit constructor 36 is a set of executable instructions that identify each device in the critical timing path and then find an equivalent circuit schematic for the element in the schematic library 44. For example, the first row of Table I specifies the buffer "buf__13x". The schematic library 44 includes a netlist characterizing that buffer. The schematic circuit constructor 36 uses that netlist to form the first element of a schematic circuit representation of the critical path. The schematic circuit constructor 36 repeats this process for each element in the critical path timing report.

FIGS. 3(a)–3(c) illustrates the schematic circuit constructed by the schematic circuit constructor 36 for the critical timing path specified in Table I. Note that each device that is specified in Table I has a schematic analog in FIGS. 3(a)–3(c).

Note that many devices have input nodes that are not connected to the signal path within the critical timing path. For example, in FIG. 3(c), the instance "byte__shift[3]" has a large number of input pads 70 that are not connected to the signal path. In accordance with the invention, a floating node connection routine 40 is used to establish proper sensitization for these nodes so that the element's operation may be simulated accurately. In particular, the floating node connection routine relies upon a predetermined rule set and default values that are used to define connections for circuit element nodes that are not on the critical path.

As indicated above, preferably, the schematic library 44 does not include schematics for relatively large devices. Such devices will substantially increase the processing time required to simulate the timing path. Thus, in accordance with the invention, such devices are preferably omitted from the schematic library 44. Instead, an ideal element constructor is used to characterize the omitted element. Element 80 in FIG. 3(b) is a device "sf_m_lbd64", which is a 64-bit leading bit detector. This relatively large element is characterized as an ideal element. That is, static timing information regarding the element is used to construct a schematic representation of the element that accurately reflects the timing properties of the element. By way of example, the following code is an example of the data that a static timing analyzer would include for the device "sf_m_lbd64".

```
(1)   MODEL sf_m_lbd64
(2)   INPUT "man[63:0]"                          CAP=0.0860301
(3)   OUTPUT "num_ones[5:0]"  DRVR=sf_m_lbd64_numones_WCCOM
(4)   OUTPUT "eq1_l"   DRVR=sf_m_lbd64_eq1_WCCOM
(5)   DELAY I "man[63:0]" *> "eq1_l"             0.76875  1.09  0.76875  1.09
(6)   DELAY E "man[63:0]"*> "num_ones[5:0]"      0.58125  1.40  0.58125  1.40
(7)   DEFDRIVER sf_m_lbd64_numones_WCCOM      RH=146.548  RL=142.288
(8)   DEFDRIVER sf_m_lbd64_eq1_WCCOM          RH=282.306  RL=269.471
```

Line (1) of the code specifies the device "sf_m_lbd64". The second line of code specifies that the device has 64 inputs "man[63:0]" and that the capacitance of each input is "0.0860301" picoFarads. The third line of code specifies a 6-bit output bus with a corresponding output drive. Line (7) defines the output drive values as being "146.548" Ohms for a high output signal and "142.288" Ohms for a low output signal. Similar information is provided in lines (4) and (8). Line (5) specifies the inverted signal delay for the element. The value "0.76875" specifies a minimum low-to-high delay in nano-seconds, while the value "1.09" specifies a maximum low-to-high delay in nano-seconds. The value "0.76875" specifies a minimum high-to-low delay in nano-seconds, while the value "1.09" specifies a maximum high-to-low delay in nano-seconds. Line (8) describes similar values for a non-inverting signal.

The foregoing information is used by a static timing analyzer 32 in a known manner to calculate a timing delay for the element "sf_m_lbd64" under various conditions. In accordance with the invention, the ideal element constructor 42 fetches this information and uses it in constructing a schematic representation of the element. The schematic representation of the element provides accurate timing information that can be used by a circuit simulator along with the other elements in the critical timing path.

FIG. 4 illustrates an ideal element 80 constructed in accordance with an embodiment of the invention. Each ideal element that is constructed may use the same schematic representation, but with different values that characterize the timing performance of the modeled element. The circuit schematic of FIG. 4 is described with a set of instructions. For example, the following set of instructions follow the syntax of the circuit simulator HSPICE.

```
(10)  .subckt delay out in
(11)  +cin=10F
(12)  + rout=1K
(13)  +ideal_delay=1ns
(14)  .param rtrig = 1K
(15)  .param rdelay = 1K
(16)  .param vdelta = 0.1v
(17)  cin in 0 'cin'
(18)  gtrig 1    0 VCCS PWL(1) in 0 SCALE='1/rtrig'
(19)  +          0v,                     vlow,
(20)  +          'vmidpoint-vdelta',     vlow,
(21)  +          'vmidpoint+vdelta',     vhigh,
(22)  +          vhigh,                  vhigh
(23)  rtrig 1 0 'rtrig'
(24)  gdelay 2 0 DELAY 1 0 TD='ideal_delay'
          SCALE='1/rdelay'
(25)  rdelay 2 0 'rdelay'
```

```
(26)  eout 3 0 2 0 1
(27)  rout 3 out 'rout'
(28)  .ends
```

Line (10) defines a "delay" element with an "out" node and an "in" node. Line (11) establishes that the input capacitor "Cin", shown in FIG. 4, has a value of 10 Farads. Line (12) defines the "Rout" resistor of FIG. 4 as having a value of 1 kilo-Ohm. Line (13) defines an ideal delay of 1 nano-second. The values in lines (11)–(13) are default values, substitute values are preferably passed to the code dependent upon the circuit element that is being modeled. In other words, the static timing information described in lines (1)–(8) above is used to establish values for "Cin", "rout", and "ideal_delay". The "Cin" value is obtained from line (2) of the code. The "rout" value is obtained from line (7) or (8) of the code. In other words, dependent upon the operation to be performed by the circuit element, one of the values from line (7) or (8) is selected as the "rout" value. Similarly, the "ideal_delay" value is obtained from line (5) or (6) of the code, dependent upon the operation to be performed by the circuit element. The ideal element constructor 42 includes a rule set for selecting these values from the static timing analyzer cell information.

Line (14) defines an ohm value for the "rtrig" resistor shown in FIG. 4. Similarly, line (15) defines an ohm value for the "rdelay" resistor shown in FIG. 4. Line (16) defines a voltage value that is used in subsequent code.

Line (17) defines that an input capacitance "Cin" exists between the node "in" and ground ("0"). Line (18) defines the current source "gtrig" shown in FIG. 4, which is connected between node "1" (shown in FIG. 4) and ground ("0"). Line (18) also specifies a voltage controlled current source (VCCS) piece-wise linear (PWL) first order model. The control voltage is the voltage across the capacitor "Cin", as defined with the instruction "in 0", meaning the element between the node "in" and "0". A scale factor of "1/rtrig" is also defined in line (18).

Lines (19)–(22) define various output voltage values for different input voltage values. In particular, line (19) stipulates that if the input voltage is 0 volts, then the output voltage is set to a very low value "vlow", which is defined as a global value. Line (21) states that if the input voltage is at a voltage midpoint level (say, Vdd/2), plus the previously defined "vdelta" value, then the output voltage is set to a very high value "vhigh", which is also a global value. Line 23 defines the resistor "rtrig" between node 1 and ground ("0"), which is consistent with FIG. 4.

In sum, lines (18)–(23) are used to generate a large gain around the voltage mid-point of the circuit. The large voltage change results in a large current across "gtrig", which results in a large voltage across "Rtrig".

The voltage across "Rtrig" is used to control the voltage controlled current source "gdelay". The current source "gdelay" generates a current a certain time after it sees the voltage across "rtrig". That delay value is defined by the "ideal_delay" variable, which is preferably obtained from the static timing information for this cell, as provided by lines (5) and (6) above.

Line (24) defines the current source "gdelay" between the node "2" and ground ("0"). The line also stipulates that the control voltage is the voltage across the element connected between node "1" and ground, which is the element "Rtrig". Further, the line defines the time delay "TD" as being equivalent to the previously discussed "ideal_delay". Finally, the same line defines a scale factor. Line (25) defines the "rdelay" resistor as being connected between node "2" and ground.

Line (26) defines a voltage controlled voltage source "eout", which is connected between node "3" and ground. The line also specifies that the control voltage is defined between node "2" and ground, which is equivalent to specifying the resistor "rdelay". Line (27) states that the resistor "rout" is positioned between node "3" and the output node "out".

Returning again to FIG. 2, step 66 produces a set of timing results. In other words, after the schematic circuit constructor 36 matches cells in the schematic library 44, connects floating nodes, and generates ideal elements, a schematic representation of the critical timing path exists. This critical timing path is then simulated by a circuit simulator to produce a set of timing results. An example set of timing results for the critical timing path discussed herein is shown in Table II.

TABLE II

REDUNDANT TIMING REPORT

| Stage | S_del | D_del | Error |
|---|---|---|---|
| Node1 | 0.000 | 0.363 | N/A |
| Node2 | 0.000 | 0.527 | N/A |
| Node3 | 0.260 | 0.220 | −15.4 |
| Node4 | 0.330 | 0.270 | −18.2 |
| Node5 | 1.470 | 1.440 | −2.0 |
| Node6 | 0.120 | 0.110 | −8.3 |
| Node7 | 0.150 | 0.130 | −13.3 |
| Node8 | 0.280 | 0.240 | −14.3 |
| Node9 | 0.240 | 0.250 | 4.2 |
| Node10 | 0.380 | 0.410 | 7.9 |
| Node11 | 0.270 | 0.240 | −11.1 |
| Node12 | 0.240 | 0.220 | −8.3 |

Each row of Table II defines timing information for a given node. Each node shown in Table II has a corresponding node shown in FIGS. 3(a)–3(b). The delay calculated by the static timing analyzer for that node is given in the column marked (S_del). The delay calculated by the circuit simulator for a node is given in the column marked (D_del). An error value is then specified in the final column. In this example, the error is defined through the following calculation:

$$(D\_del-S\_del)/S\_del*100.$$

The calculation of a timing error may be considered a step in locating timing discrepancies between the timing results, which is shown as step 68 in FIG. 2. A timing discrepancy analyzer 50 may be used to make these calculations and to flag large errors as candidates for cell substitution.

The final processing step shown in FIG. 2 is to substitute cells in the critical timing path (step 70). This operation is performed with a cell substituter 52. The cell substituter 52 is a set of executable instructions that select a candidate cell for substitution, identifies logically equivalent cells in a cell library, and selects a logically equivalent cell that has improved timing performance.

Those skilled in the art will recognize a number of advantages associated with the disclosed invention. By concentrating on the critical timing paths within a circuit, overall circuit timing performance can be greatly improved with relatively few design changes in the critical timing paths. The use of a circuit simulator improves upon the timing accuracy that is provided by the static timing analyzer. The invention efficiently utilizes the circuit simulator through a novel conversion of the critical timing path into an equivalent schematic circuit representation. The conversion process includes the use of ideal circuit elements to reduce the time required for the dynamic timing analysis. In addition, the conversion process features a node connection operation to establish node connections, in accordance with a predetermined rule set, for unconnected nodes in the equivalent schematic circuit representation.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. A method of improving the timing performance of a circuit, said method comprising the steps of:

identifying a critical timing path within a circuit with a static timing analyzer that produces static timing results;

converting said critical timing path into an equivalent schematic circuit representation for simulation on a dynamic timing analyzer, wherein said converting step includes the step of matching cells of said critical timing path with cells in a schematic library, and the step of establishing node connections, in accordance with a predetermined rule set for unconnected nodes in said equivalent schematic circuit representation, and wherein said matching step includes the step of constructing an ideal delay element for predetermined large cells in said schematic library.

simulating said equivalent schematic circuit representation with a dynamic timing analyzer to produce a set of dynamic timing results; and substituting cells in said critical timing path based upon said dynamic timing results.

2. A method of improving the timing performance of a circuit, said method comprising the steps of:

producing static timing results from a static timing analyzer operating on a netlist that characterizes a circuit;

identifying from said static timing results a critical timing path within said circuit;

converting said critical timing path into an equivalent schematic circuit representation for simulation on a dynamic timing analyzer, wherein said converting step includes the step of matching cells of said critical timing path with cells in a schematic library, and the step of establishing node connections, in accordance with a predetermined rule set, for unconnected nodes in said equivalent schematic circuit representation, and wherein said matching step includes the step of constructing an ideal delay element for predetermined large cells in said schematic library;

simulating said equivalent schematic circuit representation to produce dynamic timing results;

locating timing discrepancies between said static timing results and said dynamic timing results; and substituting cells in said critical timing path based upon said timing discrepancies.

3. A computer readable memory to direct a computer to function in a specified manner, comprising:

a first set of instructions to identify a critical timing path within a circuit based upon static timing results, including instructions to invoke a static timing analyzer that produces said static timing results and instructions to identify said critical timing path from said static timing results;

a second set of instructions to convert said critical timing path into an equivalent schematic circuit representation for simulation on a dynamic timing analyzer, including instructions to match cells of said critical timing path with cells in a schematic library, instructions to construct an ideal delay element for predetermined large cells in said schematic library, and instructions to establish node connections, in accordance with a predetermined rule set, for unconnected nodes in said equivalent schematic circuit representation;

a third set of instructions to simulate said equivalent schematic circuit representation to produce dynamic timing results; and a fourth set of instructions to substitute cells in said critical timing path based upon said dynamic timing results.

* * * * *